United States Patent [19]

Takeshima et al.

[11] Patent Number: 4,602,695
[45] Date of Patent: Jul. 29, 1986

[54] CONTROL DEVICE FOR POWER STEERING APPARATUS

[75] Inventors: Sadao Takeshima, Higashimatsuyama; Kunio Okada, Hiki; Katsumi Higashi, Higashimatsuyama, all of Japan

[73] Assignee: Jidosha Kiki Co., Ltd., Tokyo, Japan

[21] Appl. No.: 698,655

[22] Filed: Feb. 6, 1985

[30] Foreign Application Priority Data

Feb. 10, 1984 [JP] Japan .................. 59-21959

[51] Int. Cl.$^4$ .............................. B62D 5/06
[52] U.S. Cl. ..................... 180/143; 180/79; 180/148; 364/424
[58] Field of Search ............. 180/143, 141, 146, 147, 180/148, 159, 160, 161, 162, 79, 79.1; 74/388 PS; 92/136; 91/368, 375 A; 364/424

[56] References Cited

U.S. PATENT DOCUMENTS

| | | | |
|---|---|---|---|
| 3,045,221 | 7/1962 | Roop | 364/424 X |
| 4,212,366 | 7/1980 | Ohtuka et al. | 180/141 |
| 4,216,841 | 8/1980 | Ohtuka et al. | 180/141 |
| 4,476,529 | 10/1984 | Nakamura et al. | 364/424 |
| 4,518,055 | 5/1985 | Yagi et al. | 74/388 PS X |

FOREIGN PATENT DOCUMENTS 79754  6/1980 Japan .................. 180/142

Primary Examiner—John J. Love
Assistant Examiner—Mitchell J. Hill
Attorney, Agent, or Firm—Townsend & Townsend

[57] ABSTRACT

A control device for a power steering apparatus for controlling a torque applied to the power steering apparatus in accordance with a travel condition.

A travel condition determining unit generates a travel condition signal in accordance with an average steering angle value and an average velocity value. A load determining unit generates a load signal in accordance with a sensed load condition. A correction signal generating unit generates a correction signal in accordance with the travel condition signal and the load signal. A memory stores a single reference control characteristic for the power steering apparatus. A correcting unit corrects the reference control characteristics in accordance with the correction signal to provide optimal power steering control.

4 Claims, 13 Drawing Figures

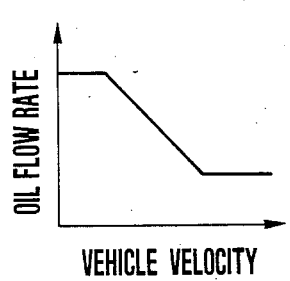
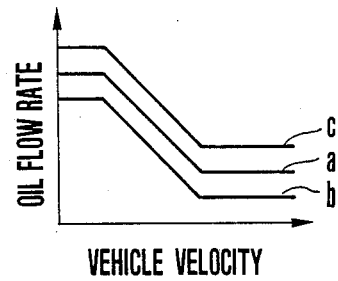
FIG.1  FIG.2
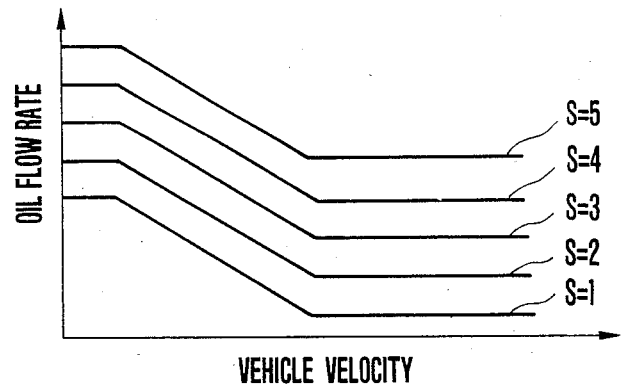
FIG.4
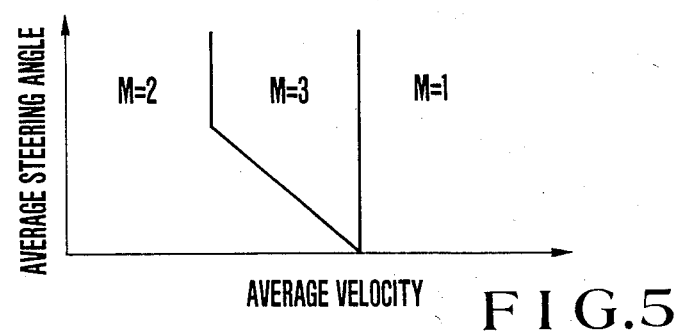
FIG.5

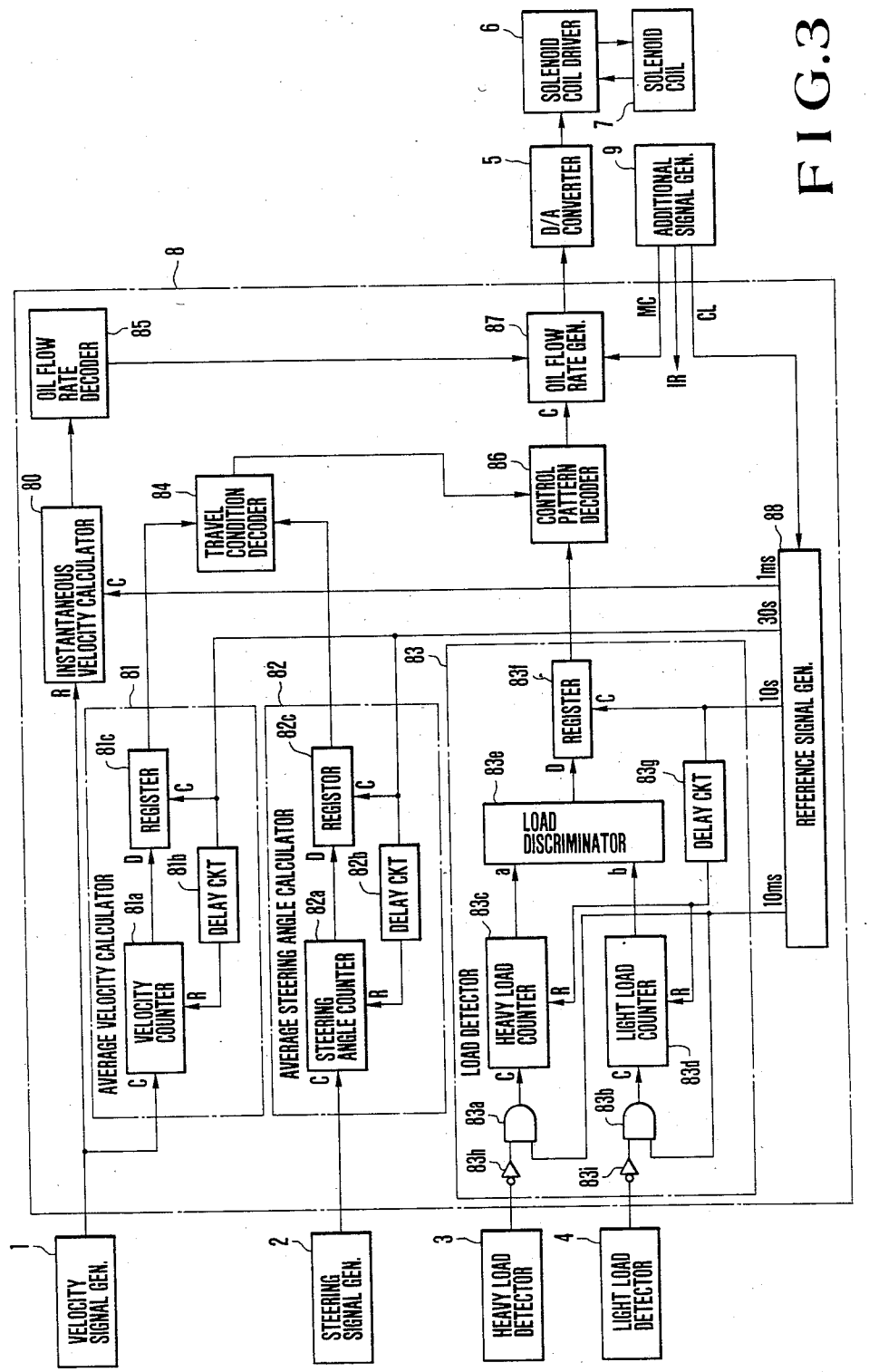

CONTROL DEVICE FOR POWER STEERING APPARATUS

BACKGROUND OF THE INVENTION

The present invention relates to a control device for a power steering apparatus, wherein light power steering can be performed irrespective of travel conditions.

A conventional power steering apparatus is controlled such that working oil is supplied from an oil pump to a power steering unit through a solenoid valve in accordance with a vehicle velocity as plotted in FIG. 1 so as to provide a constant steering force in a wide velocity range. When a vehicle travels along a highway, the steering wheel is held substantially straight, and steering angles are small. However, when the vehicle travels along a mountain road having many steep curves, the steering wheel is often turned, and steering angles are large. Thus, in FIG. 2, when a flow rate required for normal driving on an average city road is represented by a curve a, a flow rate required for driving on a highway where a low flow rate is required by a curve b, and a flow rate required for driving on a mountain road where a high flow rate is required by a curve c. Therefore, three characteristics are stored in a memory. A proper characteristic is read out from the memory so as to control power steering.

However, the steering force is also changed in accordance with a load. In order to keep the steering force constant if the load changes, there must be different characteristics for different loads. If heavy, intermediate and light loads are set, nine characteristics must be prepared and a large-capacity memory is necessary, resulting in increased cost.

SUMMARY OF THE INVENTION

It is, therefore, a principal object of the present invention to provide a simple, low-cost control device for a power steering apparatus, wherein power steering control is properly performed with respect to changes in a load.

It is another object of the present invention to provide a control device for a power steering apparatus, wherein a single memory which stores one control characteristic is used to perform appropriate power steering with respect to changes in travel conditions of the vehicle and changes in a load.

In order to achieve the above objects of the present invention, one reference power steering control characteristic is stored in the memory, a travel condition signal representing that the vehicle is travelling on a mountain road, an average city road, or a highway is generated in accordance with an average steering angle and an average velocity, a correction signal is generated in accordance with the travel condition signal and a load signal representing a load state, and the reference power steering control characteristic is corrected to perform proper power steering control in accordance with the correction signal.

BRIEF DESCRIPTION OF THE DRAWINGS

FIGS. 1, 2, and 4 are respectively graphs each showing the oil flow rate as a function of the vehicle velocity;

FIG. 3 is a block diagram of a control device for a power steering apparatus according to an embodiment of the present invention;

FIG. 5 is a graph showing the average steering angle as a function of the average velocity;

DETAILED DESCRIPTION OF THE PREFERRED EMBODIMENT

Figure 6:
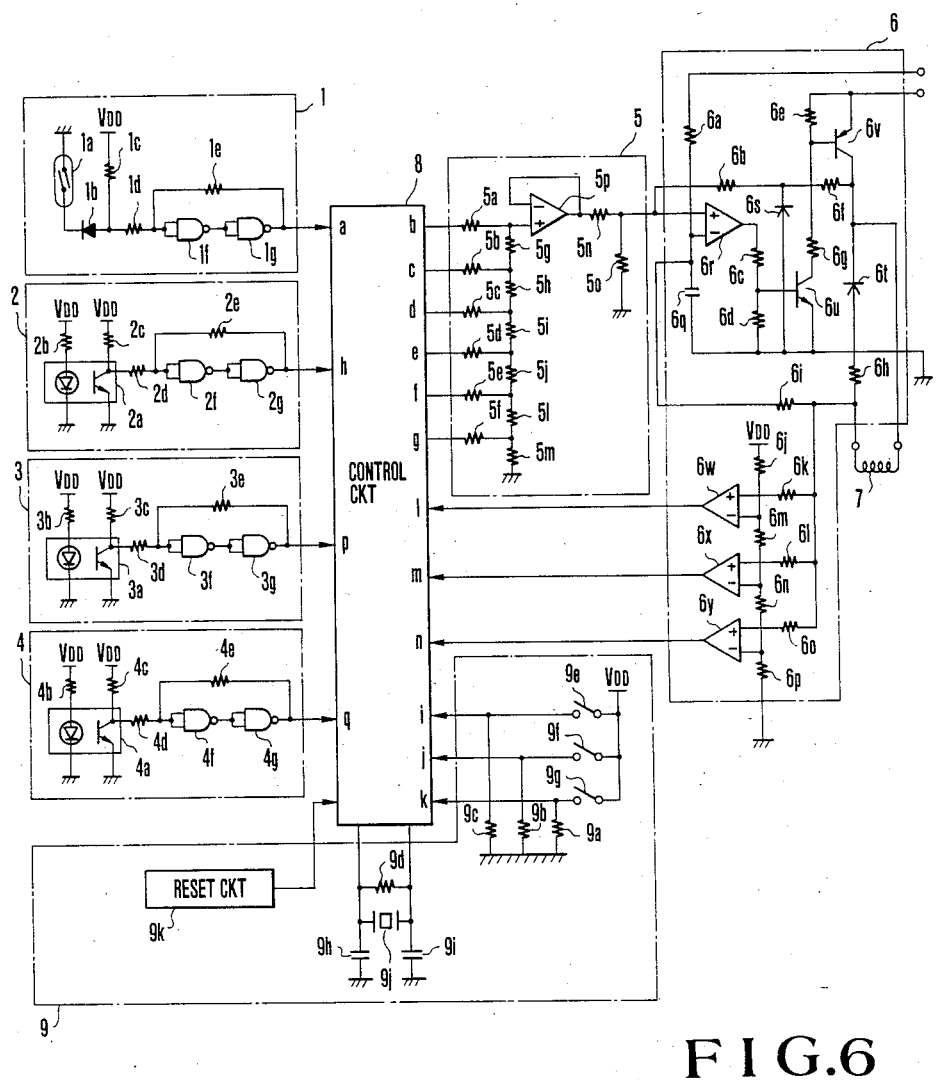
FIG. 6 is a circuit diagram of the device shown in FIG. 3 when the device comprises a CPU.

FIG. 3 is a block diagram of a control device for a power steering apparatus according to an embodiment of the present invention. Referring to FIG. 3, reference numeral 1 denotes a velocity signal generator which generates a velocity signal in which the number of pulses changes in accordance with a change in vehicle velocity. Reference numeral 2 denotes a steering signal generator which generates a steering signal in which the number of pulses changes in accordance with a change in steering angle. Reference numeral 3 denotes a heavy load detector for generating a heavy load signal of logic "0" when an actual load is larger than a predetermined heavy load. Reference numeral 4 denotes a light load detector for generating a light load signal of logic "0" when an actual load is smaller than a predetermined light load. Reference numeral 5 denotes a D/A converter; 6, a solenoid coil driver; and 7, a solenoid coil. The solenoid coil driver 6 controls a duty ratio of a signal generated in response to a voltage supplied from the D/A converter 5. The solenoid coil driver 6 also controls a duty ratio of an output signal generated in accordance with a current flowing through the solenoid coil 7. The solenoid coil 7 controls a valve (not shown) arranged in an oil pipe in accordance with the duty ratio of the signal supplied from the solenoid coil driver 6, thereby controlling the flow rate of the oil supplied to the power steering apparatus. Reference numeral 8 denotes a control circuit; and 9, an additional signal generator. The control circuit 8 corrects an oil flow rate given by the velocity signal in accordance with a travelling condition given by the average steering angle and the average velocity. The additional signal generator 9 generates an initial reset signal IR, a clock signal CL, and a manual control signal for changing a steering force as needed.

The control circuit 8 comprises: an instantaneous velocity calculator 80 for calculating an instantaneous velocity signal in accordance with the period of a pulse signal generated from the velocity signal generator 1; an average velocity calculator 81 for calculating an average velocity signal during a 30-second sampling period in accordance with the velocity signal; an average steering angle calculator 82 for calculating an average steering signal during a 30-second sampling period; a load detector 83 for generating a load signal in accordance with signals from the heavy load detector 3 and the light load detector 4; a travel condition decoder 84 for generating a travel condition signal representing that the vehicle is travelling on a mountain road, an average city road, or a highway in accordance with a relationship between the average velocity signal and the average steering signal; an oil flow rate decoder 85 for decoding an oil flow rate signal (to be supplied to the power steering apparatus) in correspondence with the actual velocity represented by the instantaneous velocity signal; a control pattern decoder 86 for generating a correction signal for correcting the oil flow rate signal in accordance with the travel condition signal and the load signal; an oil flow rate generator 87 serving as a correcting means for correcting the oil flow rate by adding the oil flow rate signal to the correction signal; and a reference signal generator 88 for generating 1-msec, 10-msec, 1-sec and 30-sec signals as the reference signals of the above components.

The instantaneous velocity calculator 80 counts up every time a terminal T receives a pulse. When a signal of logic "1" is supplied to a terminal R, a current count is stored and generated. The count generated every time the terminal R receives the signal is updated to a count counted during the pulse width of the signal supplied thereto.

The average velocity calculator 81 comprises a velocity counter 81a a delay circuit 81b for delaying an input signal thereto by 1 msec, and a register 81c. The average steering angle calculator 82 comprises a steering counter 82a, a delay circuit 82b and a register 81c. The velocity counter 81a and the steering counter 82a count up every time signals are supplied to terminals T respectively. Every time signals of logic "1" are supplied to terminals R, the counts are respectively reset. The delay circuit 82b has the same function as that of the delay circuit 81b.

The load detector 83 comprises AND gates 83a and 83b, a heavy load counter 83c, a light load counter 83d, a load discriminator 83e, a register 83f, a delay circuit 83g having the same function as that of the delay circuit 81b, and inverters 83h and 83i. The counters 83c and 83d count up every time signals of level "1" are supplied to terminals T, respectively. The counts of the counters 83c and 83d are reset when signals are supplied to terminals R, respectively. The load discriminator 83e discriminates a light, intermediate or heavy load in accordance with values of signals supplied to terminals a and b thereof, as shown in Table 1 below:

TABLE 1

| Phenomenon | | Discrimination |
| --- | --- | --- |
| Data of heavy load < counter 83c | Data of light load counter 83d | light load |
| Data of heavy load > counter 83c | Data of light load counter 83d | heavy load |
| Data of heavy load = counter 83c | Data of light load counter 83d | intermediate load |

The operation of the control device having the arrangement described above will be described hereinafter. When the vehicle is started, the velocity signal from the velocity signal generator 1 is supplied to the instantaneous velocity calculator 80. The instantaneous velocity calculator 80 counts 1-msec signals supplied to the terminal T. Every time the velocity signal is supplied to the terminal R, the instantaneous velocity calculator 80 generates a count, i.e., the instantaneous velocity signal.

The instantaneous velocity signal calculated in the manner described above is supplied to the oil flow rate decode 85. The oil flow rate decoder 85 conventionally stores all oil flow rate characteristics required for all travel conditions. For example, as shown in FIG. 4, the oil flow rate characteristics are given in a range between S=1 and S=5, thereby preparing five flow characteristics which are conventionally stored in the oil flow rate decoder 85. However, according to this embodiment, only one characteristic represented by S=3 is stored in the oil flow rate detector 85. As a result, the oil flow rate decoder 85 generates a signal representing the oil flow rate (S=3 in FIG. 4) corresponding to the instantaneous velocity, and the readout signal is supplied to the oil flow rate generator 87.

The velocity signal is also supplied to the average velocity calculator 81. Every time the velocity signal is received by the velocity counter 81a in the average velocity calculator 81, the counter 81a is counted up. The average velocity calculator 81 receives a reference signal every 30 seconds from the reference signal generator 88. Every time the reference signal is supplied to the average velocity calculator 81, the register 81c fetches the count of the counter 81a. The reference signal is also delayed by the delay circuit 81b by a proper time interval, e.g., 1 msec. The 1-msec-delayed signal is supplied to the terminal R of the velocity counter 81a, so that the velocity couter 81a is reset. When the velocity counter 81a is released from the reset state, it starts counting the velocity signals again. The register 81c generates the count of the velocity pulses during 30 seconds as an average velocity signal. The average velocity signal is supplied to the travel condition decoder 84. Similarly, a steering signal generated from the steering signal generator 2 is calculated by the average steering angle calculator 82. The average steering angle calculator 82 generates the count of the steering pulses during 30 seconds as an average steering signal. The average steering signal is supplied to the travel condition decoder 84.

The travel condition decoder 84 comprises a ROM for storing characteristics given as variables by the average velocity and the average steering angle, as shown in FIG. 5. When the travel condition decoder 84 receives the average velocity and the average steering angle, a signal representing the corresponding travel condition is read out and supplied to the control pattern decoder 86. Referring to FIG. 5, a region represented by reference symbol M=2 indicates a low average velocity region. In the small average velocity range, the average steering angle range is wide. In the large average vehicle range, the average steering angle range is narrow. The region M=2 represents driving along an average city road. A region represented by reference symbol M=3 indicates an intermediate average velocity region. In this region M=3, in the small average velocity range, the average steering angle is in a relatively large range. The average steering angle range is widened as the average velocity is increased. The region M=3 thus represents driving along a mountain road. A region represented by reference numeral M=1 indicates a high average velocity region. The region M=1 represents driving along a highway.

The load detector 83 receives signals from the heavy load detector 3, the light load detector 4 and the velocity signal generator 1 and generates a load signal in accordance with these signal states. The load signal is supplied to the control pattern decoder 86.

The load detector 83 operates in the following manner. Assume that the load condition is a heavy load condition. The heavy load detector 3 generates a signal of logic "0" which represents the heavy load condition. An output from the light load detector 4 is kept logic "1". For this reason, the AND gate 83a generates a signal of logic "1" every time a 10-msec reference signal is supplied thereto from the reference signal generator 88. However, an output signal from the AND gate 83b is kept logic "0". During the heavy load condition detection period, the heavy load counter 83c is counted up for every 10 msec. A count from the counter 83c is supplied to the load discriminator 83e. The load discriminator 83e discriminates that the data from the heavy load counter 83c is larger than that of the light load counter 83d in accordance with Table 1. The load discriminator 83e thus discriminates that the current load condition is the heavy load condition. A heavy load condition signal is supplied from the load discriminator 83e to the register 83f. Since the terminal T of the register 83f receives the 10-sec reference signal from the reference signal generator 88, the storage content of the register 83f is updated for every 10 seconds and is generated. The 10-sec reference signal is also supplied to the heavy load counter 83c and the light load counter 83d through the delay circuit 83g. The counts of the counters 83c and 83d are reset, so that the counters 83c and 83d are updated every 10 seconds. The above description applies when the load condition is the heavy load condition. However, a similar operation as described above can be performed for the intermediate or light load condition. The load detector 83 generates a load signal representing a current load condition in accordance with Table 2:

TABLE 2

| Load Condition | Output Signal Level |
| --- | --- |
| Light load condition | L = 0 |
| Intermediate load condition | L = 1 |
| Heavy load condition | L = 2 |

The travel condition signal and the load signal which are calculated as described above are supplied to the control pattern decoder 86 and are subjected to calculation in accordance with equation (1) below, so that the control pattern decoder 86 supplies a correction signal to the oil flow rate generator 87:

$$C = M + L \quad (1)$$

where
  C is the correction signal
  M is the travel condition signal
  L is the load signal The correction signal C is a sum of the travel condition and the load condition.

Figure 11:
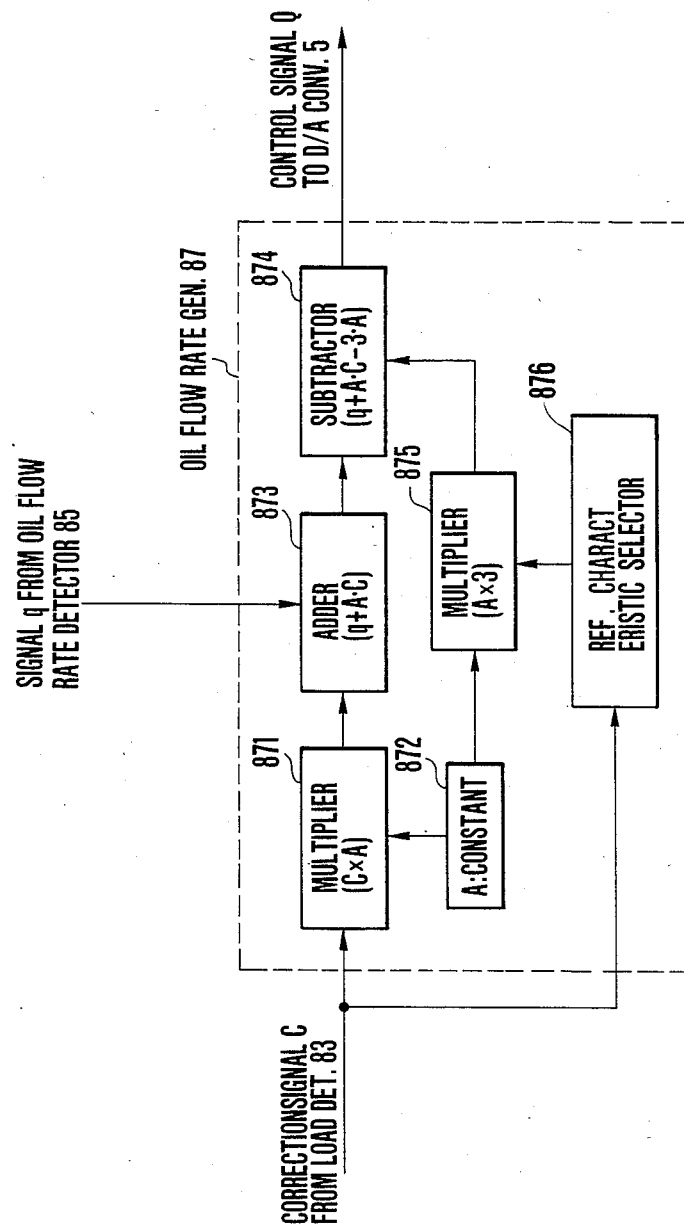
FIG. 11 is a detailed block diagram of an oil flow rate detector 85.

In addition to the correction signal C, the oil flow rate generator 87 also receives an oil flow rate signal q determined in accordance with the characteristic S=3 read out from the oil flow rate decoder 85 and the velocity. The oil flow rate generator 87 generates a control signal for controlling a power steering apparatus (not shown):

$$Q = q + A(C-3) \quad (3)$$

where
  Q is the control signal
  q is the signal for controlling the oil flow rate represented by the readout reference characteristic
  A is a distance between the respective characteristics when the distances therebetween are assumed to be equal The reference characteristic is given as S=3 of FIG. 4. For example, when the travel condition is given by M=1, and the load signal is given by L=1, the correction signal is calculated as C=2 in accordance with equation (1). The control signal is given by Q=q−A in accordance with equation (2). Therefore, the characteristic S=2 of FIG. 4 is actually selected. Similarly, if M=1 and L=0, the control signal is given by Q=q−2. In this case, the characteristic given by S=1 of FIG. 4 is selected. A function block of the oil flow rate generator 87 is illustrated in FIG. 11. Referring to FIG. 11, the correction signal C from the load detector 83 is supplied to a multiplier 871. The multiplier 871 multiplies the correction signal C with the constant A determined in the manner as described above. A multiplied result A·C is supplied to an adder 873. The adder 873 adds the signal q read out in accordance with the reference characteristic so as to control the oil flow rate to the output A·C generated from the multiplier 871, thereby obtaining an output (q+A·C). This output is supplied to a subtracter 874. The subtracter 874 also receives a value 3·A from a multiplier 875 representing difference between the reference characteristic and the actually selected characteristic. The subtracter 874 subtracts the value 3·A from the input (q+A·C) to derive an output (q+A·C−3·A)=q+A(C−3). This output is generated as the control signal Q from the subtracter 874. The multiplier 875 multiplies an output from a reference characteristic selector 876 receiving the signal from the load detector 83 with the constant A. An output from the selector 876 is derived from a combination of a manual signal for selecting one of several characteristics and the signal C from the load detector 83. In this manner, when the reference characteristic is shifted in accordance with the driving or travel condition, only one characteristic need be stored in the oil flow rate decoder 85 to perform power steering control corresponding to all travel conditions. It should be noted that the above description with reference to FIG. 11 only exemplifies the operation of the oil flow rate generator 87, and that the parameter q of the oil flow rate characteristic of FIG. 4 can arbitrarily vary.

A signal from the oil flow rate generator 87 is converted by the D/A converter 5 to an analog voltage signal. This analog voltage signal is converted by the solenoid coil driver 6 to a solenoid coil drive signal having a duty ratio corresponding to a magnitude of the analog voltage signal. As a result, the solenoid coil 7 supplies an amount of oil to a power steering apparatus (not shown) in accordance with this duty ratio, thereby performing power steering control corresponding to the driving condition.

Figure 7:
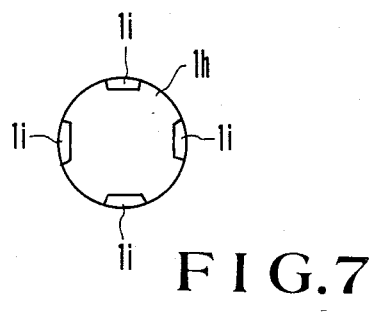
FIG. 7 is a representation showing an arrangement of a disk and magnets to generate a velocity signal.
Figures 8A, 8B:
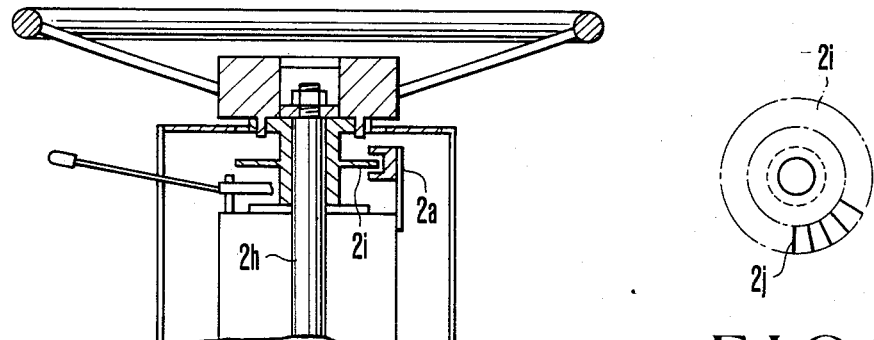
FIG. 8A is a sectional view of a steering shaft portion having a photointerrupter 2a of a steering signal generator.
FIG. 8B is a plan view showing a slit disk 2i.

FIG. 6 is a circuit diagram of a circuit when the device shown in FIG. 3 comprises a CPU. Referring to FIG. 6, the velocity signal generator 1 comprises a lead switch 1a, a diode 1b, resistors 1c to 1e, and NAND gates 1f and 1g. The lead switch 1a is arranged in the vicinity of a disk 1h rotated together with the vehicle axle, as shown in FIG. 7. Every time each of magnets 1i arranged in the peripheral portion of the disk 1h is brought into contact with the lead switch 1a, the lead switch 1a is turned on to generate the velocity signal. The steering signal generator 2 comprises a photointerrupter 2a, resistors 2b to 2e, and NAND gates 2f and 2g. The photointerrupter 2a is arranged in the vicinity of a slit disk 2i rotated together with a steering shaft 2h, as shown in FIG. 8A. As shown in FIG. 8B, every time a slit 2j formed in the slit disk 2i passes by the recess of the photointerrupter 2a, the photointerrupter 2a is turned on. The heavy load detector 3 comprises a photointerrupter 3a, resistors 3b to 3e, and NAND gates 3f and 3g. The light load detector 4 comprises a photointerrupter 4a, resistors 4b to 4e, and NAND gates 4f and 4g.

Figure 9:
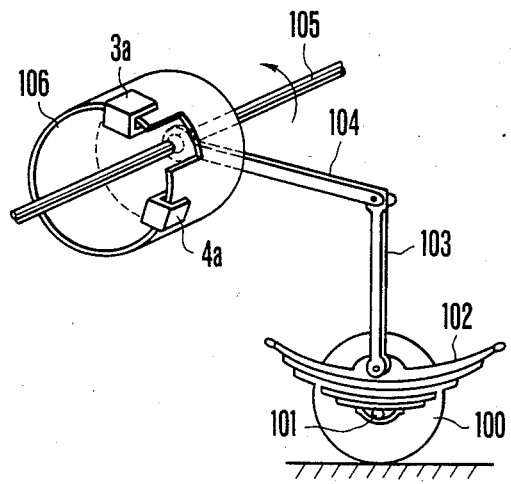
FIG. 9 is a perspective view of a load sensor arranged with photointerrupters 3a and 4a of heavy and light load detectors.

The photointerrupters 3a and 4a are built into the load sensors, as shown in FIG. 9. Referring to FIG. 9, reference numeral 100 denotes a vehicle; 101, an axle; 102, a leaf spring; 103, a link; 104, a lever; 105, a shaft; and 106, a cylinder. The shaft 105 is rotatably supported by a vehicle body (not shown). The cylinder 106 is rotated together with the shaft 105. One end of the lever 104 is fitted to the shaft 105, and the lever 104 is rotated together with the shaft 105. The other end of the lever 104 is pivotally supported by the upper end of the link 103. The lower end of the link 103 is fixed at the central portion of the leaf spring 102. When the load is increased and thus decreases the vehicle height, the position of the link 103 does not change, but the shaft 105 is moved downward while the shaft 105 is being rotated. The photointerrupters 3a and 4a are fixed on the vehicle body. The photointerrupters 3a and 4a are turned on/off when light from the light-emitting portions is shielded by a peripheral portion of the cylinder 106 located separately from the light-emitting portions or passes through a slit 106b.

The D/A converter 5 comprises resistors 5a to 5o and an operational amplifier 5p. The solenoid coil driver 6 comprises resistors 6a to 6p, a capacitor 6q, an operational amplifier 6r, diodes 6s and 6t, transistors 6u and 6v, and comparators 6w, 6x and 6y. The additional signal generator 9 comprises resistors 9a to 9d, switches 9e to 9g, capacitors 9h and 9i, a ceramic oscillator 9j, and a reset circuit 9k. The control circuit 8 as the CPU comprises an LM6402 available from Sanyo Electric Co., Ltd.

Figure 10A:
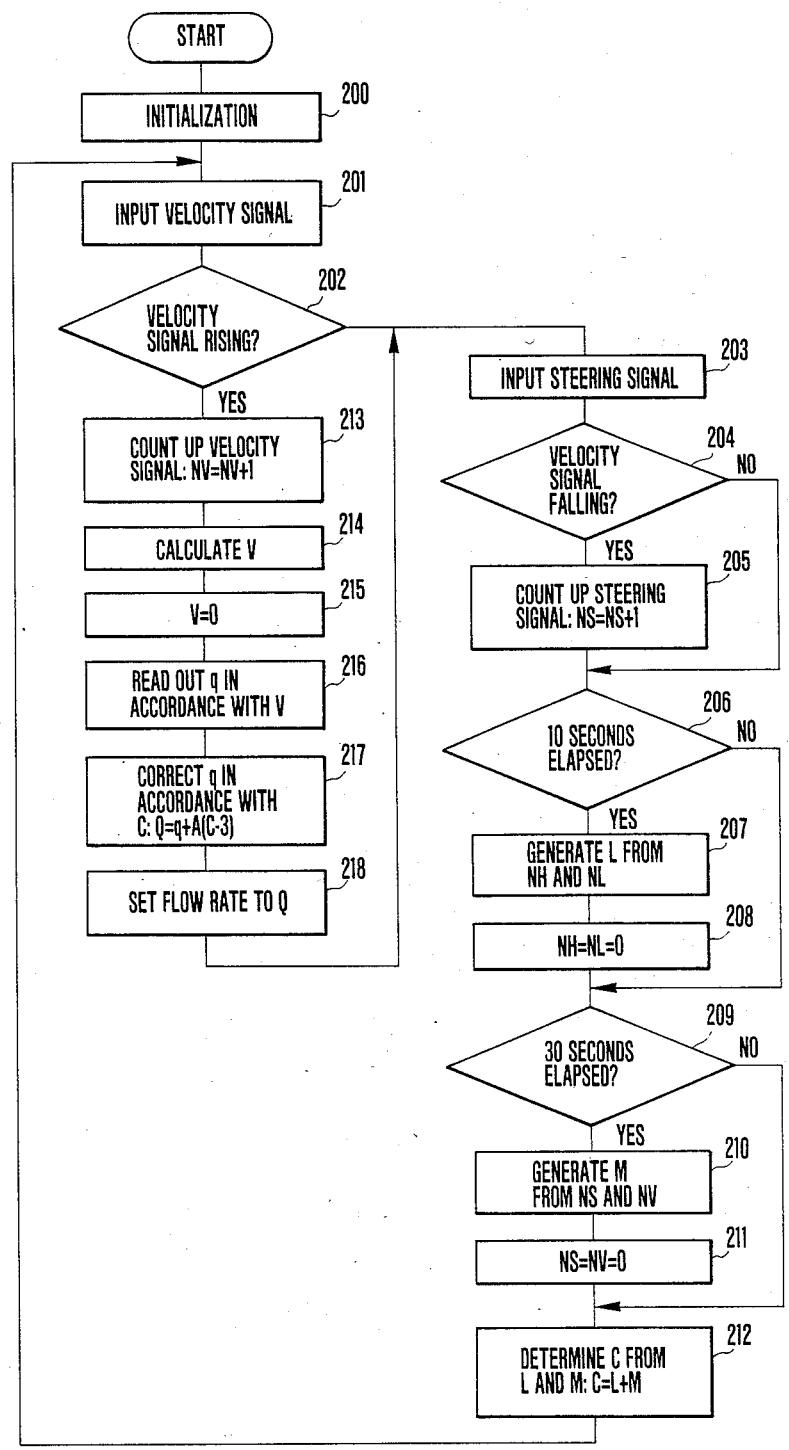
FIGS. 10A and 10B are respectively flow charts for explaining the operations of the device of FIG. 6.
Figure 10B:
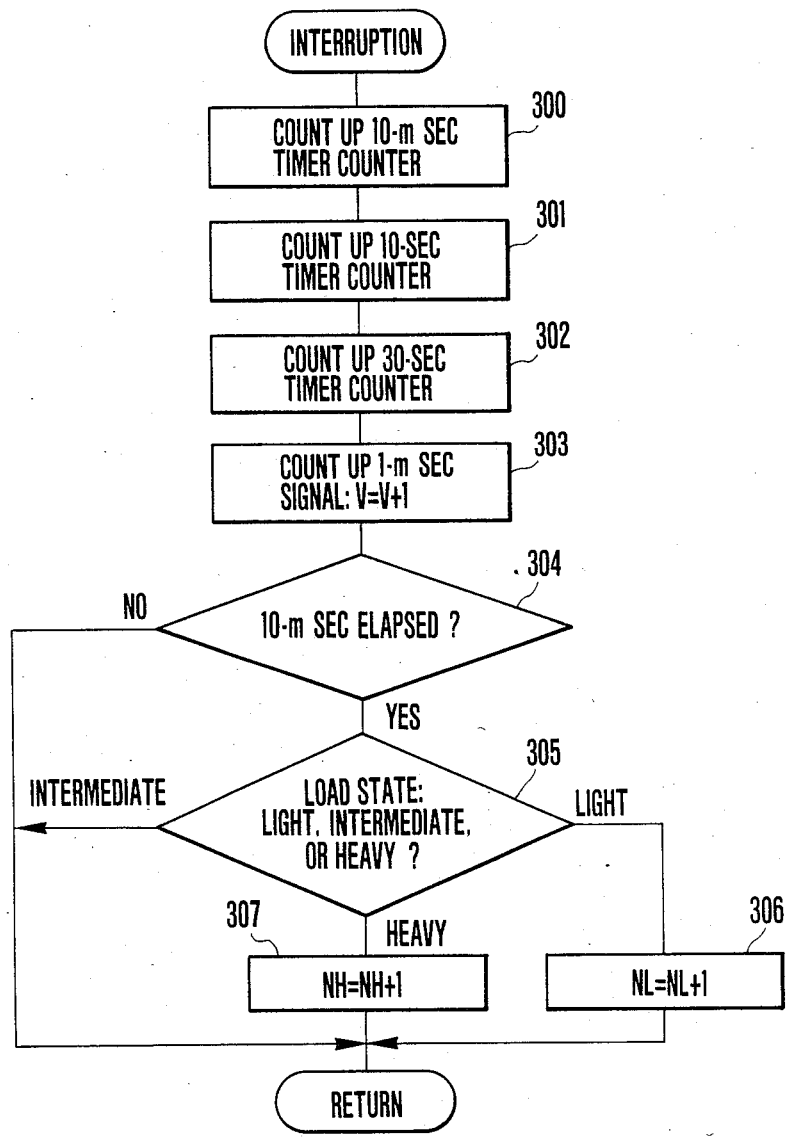

The device having the above arrangement is controlled in accordance with a program written in the control circuit 8, as shown in flow charts of FIGS. 10A and 10B. FIGS. 10A and 10B show a program for performing the same operation as in the device of FIG. 3.

Referring to FIG. 10A, when initialization in step 200 is performed, an interrupt operation shown in FIG. 10B performed for every 1 msec. Timers (not shown) arranged in the reference signal generator 88 of FIG. 3 are operated in the following manner. In step 300, a 10-msec timer is counted up; in step 301, a 10-sec timer is counted up; and in step 302, a 30-sec timer is counted up. In step 303, a counter (not shown) arranged in the instantaneous velocity calculator 80 counts 1-msec signals from the reference signal generator 88, thereby updating a count V of the counter. After the control circuit 8 checks in step 304 that 10 msec have elapsed, the circuit 8 checks in step 305 whether a load condition is light, intermediate or heavy. When the control circuit 8 determines in step 305 that the load condition is light, the count of the light load counter 83d in FIG. 3 is incremented by one in step 306. However, when the control circuit 8 determines that the load condition is heavy, the heavy load counter 83c is incremented by one in step 307. When the count-up operation of the corresponding counter is completed, or when the control circuit 8 determines in step 304 that the 10 msec have not elapsed or in step 305 that the load condition is intermediate, the flow returns to the step of the main routine.

In the main routine, when the velocity signal is entered in step 201, the control circuit 8 detects the trailing edge of the velocity signal in step 202. However, when the control circuit 8 does not detect the trailing edge of the velocity signal, the steering signal is entered in step 203. When the control circuit 8 then detects the trailing edge of the steering signal in step 204, the count NS (FIG. 10A) of the steering counter 82a is incremented by one in step 205. The control circuit 8 then checks in step 206 that 10 seconds have elapsed. However, if NO in step 204, the control circuit 8 detects in step 206 that 10 seconds have elapsed.

If YES in step 206, the load discriminator 83e of FIG. 3 generates a load signal L by using the data of a count NH of the heavy load counter 83c and the data of a count NL of the light load counter 83d in accordance with Table 2 in step 207. In this case, the value of the load signal L is set at "0" for the light load condition, "1" for the intermediate load condition, and "2" for the heavy load condition. The values of the count NH of the heavy load counter 83c and the count NL of the light load counter 83d are reset to "0" in step 208. The control circuit 8 then determines in step 209 whether or not 30 seconds have elapsed. However, if NO in step 206, the operations in steps 207 and 208 are omitted, and the decision in step 209 is directly performed.

When the control circuit 8 detects in step 209 that 30 seconds have elapsed, the travel condition decoder 84 of FIG. 3 generates a travel condition signal M in accordance with the count NS of the steering counter 82a and a count NV (to be described later) of the velocity counter 81a. In this case, the value of the travel condition signal M is set at "1" for driving along a highway, "2" for driving along an average city road, or "3" for driving along a mountain road. The count NS of the steering counter 82a and the count NV of the velocity counter 81a are reset to "0" in step 211. In step 212, the value of the load signal L is added to the value of the travel condition signal M to derive a correction value C. The flow then returns to step 201. However, if NO in step 209, steps 210 and 211 are omitted.

When the operations in steps 201 to 212 are repeated and the trailing end of the velocity signal is detected in step 202, the count NV of the velocity counter 81a of FIG. 3 is incremented by one. Thereafter, the instantaneous velocity v is calculated in step 214 in accordance with the count V of the 1-msec signal counted in step 303. In step 215, the count V of the 1-msec signal is reset to "0". Thereafter, as shown in step 216, an oil flow rate signal q is read out from the oil flow rate decoder 85 in accordance with the instantaneous velocity v. In step 217, the oil flow rate signal q is corrected by using the correction value C in accordance with equation (2), thereby obtaining the optimal oil flow rate Q. In step 218, the control circuit 8 controls to set the current flow rate to the optimal oil flow rate.

The correction signal C is generated in accordance with the load signal L and the travel mode signal m. The flow rate is corrected in accordance with the correction signal C. Even if only one characteristic is stored in the oil flow rate decoder 85, the reference characteristic can be updated to three different characteristics in accordance with load conditions. These three different characteristics are further updated in accordance with three travel modes, thereby obtaining nine characteristics among which an optimal characteristic can be selected.

According to the control device for a power steering apparatus of the present invention, only one reference flow rate characteristic is stored in a memory. The data read out from this memory is corrected in accordance with the travel condition determined by the average steering angle, the average velocity and the load condition. Therefore, the control device can comprise a small-capacity memory, resulting in cost saving.

The present invention is not limited to the particular embodiment described above. Various changes and modifications may be made within the spirit and scope of the invention. In the above embodiment, an oil pump with a solenoid coil is used. However, the present invention can also be applied to a motor-controlled steering apparatus, as is known without specific description to a person skilled in the art. In this case, the solenoid coil driver 6 and the solenoid valve including the solenoid coil 7, as shown in FIG. 3 are replaced with an energization circuit or an energization control circuit for the electric motor. In addition, the oil flow rate decoder 85 and the oil flow rate generator 87 are replaced with a motor torque decoder and a motor torque generator, respectively.

What is claimed is:

1. A control device for a power steering apparatus for controlling a torque applied to said power steering apparatus in accordance with a travel condition, comprising:

travel condition determining means for generating a travel condition signal in accordance with an average steering angle and an average velocity;

load determining means for generating a load signal in accordance with a load condition;

correction signal generating means coupled to said travel condition determining means and said load determining means for generating a correction signal in accordance with the travel condition signal and the load signal;

memory means for storing a single reference control characteristic for said power steering apparatus; and correcting means coupled to said memory means and said correction signal generating means for correcting the reference control characteristic in accordance with the correction signal, thereby enabling optimal power steering control.

2. A device according to claim 1, wherein said travel condition determining means comprises: velocity signal generating means; steering angle signal generating means; means for calculating an average velocity in accordance with the velocity signal from said velocity signal generating means; means for calculating the average steering angle in accordance with the steering signal from said steering angle signal generating means; and means for determining the travel condition of a vehicle in accordance with outputs from said average velocity calculating means and said average steering angle calculating means.

3. A device according to claim 2, wherein said load determining means comprises: first and second load detecting means for detecting at least two different loads; and load discriminating means for discriminating which one of said at least two different loads is detected.

4. A device according to claim 3, wherein said load discriminating means comprises means for discriminating an intermediate load when outputs from said first and second load detecting means are the same.

* * * * *